United States Patent
Götz et al.

(10) Patent No.: US 10,919,404 B2
(45) Date of Patent: Feb. 16, 2021

(54) TRANSFORMER DEVICE FOR A CHARGING STATION FOR ELECTRICALLY CHARGING VEHICLES WITH AT LEAST TWO CHARGING POINTS

(71) Applicant: Dr. Ing. h.c. F. Porsche Aktiengesellschaft, Stuttgart (DE)

(72) Inventors: Stefan Götz, Forstern (DE); Christoph Roggendorf, Markgröningen (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 79 days.

(21) Appl. No.: 16/215,889

(22) Filed: Dec. 11, 2018

(65) Prior Publication Data

US 2019/0190297 A1   Jun. 20, 2019

(30) Foreign Application Priority Data

Dec. 19, 2017   (DE) .......................... 10 2017 130 471

(51) Int. Cl.
*B60L 53/22*   (2019.01)
*H02J 7/02*    (2016.01)
(Continued)

(52) U.S. Cl.
CPC .............. *B60L 53/22* (2019.02); *B60L 53/14* (2019.02); *B60L 53/30* (2019.02); *B60L 53/60* (2019.02);
(Continued)

(58) Field of Classification Search
CPC .......... B60L 53/22; B60L 53/14; B60L 53/30; B60L 53/60; B60L 2230/20; B60L 53/53;
(Continued)

(56) References Cited

U.S. PATENT DOCUMENTS 2,710,380 A   6/1955   de Buda
3,183,465 A   5/1965   Moore
(Continued)

FOREIGN PATENT DOCUMENTS

DE   1925095 A1   1/1970
DE   251057 A3    11/1987
(Continued)

OTHER PUBLICATIONS

English Translation of the Notice of Reasons for Refusal for Japanese Application No. 2018-235252, dated Jul. 3, 2019, 3 pages.
(Continued)

*Primary Examiner* — Nha T Nguyen
(74) *Attorney, Agent, or Firm* — RatnerPrestia

(57) ABSTRACT

A transformer device for a charging station for electrically charging vehicles with at least two charging points, having an input connection for electrical connection to an electrical power source, also having a primary winding and at least one secondary winding for each charging point. The secondary windings are DC isolated from one another and each have at least one winding section which is connected electrically in parallel. Adjacent winding sections of at least one secondary winding overlap one another at least partially in an axial direction or radial direction.

11 Claims, 3 Drawing Sheets

(51) Int. Cl.
- *H02J 7/00* (2006.01)
- *B60L 53/60* (2019.01)
- *B60L 53/14* (2019.01)
- *H01F 38/14* (2006.01)
- *H01F 27/28* (2006.01)
- *B60L 53/30* (2019.01)

(52) U.S. Cl.
CPC ......... *H01F 27/2823* (2013.01); *H01F 38/14* (2013.01); *H02J 7/0027* (2013.01); *H02J 7/022* (2013.01); *B60L 2230/20* (2013.01); *H01F 2027/2838* (2013.01)

(58) Field of Classification Search
CPC ............... H01F 38/14; H01F 27/2823; H01F 2027/2838; H01F 30/04; H01F 27/324; H01F 30/12; H02J 7/022; H02J 7/0027; Y02T 90/12; Y02T 10/7072; Y02T 90/14; Y02T 10/70; H02M 5/10; B60Y 2200/91
See application file for complete search history.

(56) References Cited

U.S. PATENT DOCUMENTS

| | | | |
|---|---|---|---|
| 3,252,117 A | 5/1966 | Fischer | |
| 3,538,473 A | 11/1970 | Leibinger | |
| 2010/0213921 A1* | 8/2010 | Abolhassani | H02M 5/458 323/328 |
| 2013/0020989 A1* | 1/2013 | Xia | B60L 53/30 320/109 |
| 2015/0061807 A1* | 3/2015 | Chu | H01F 27/322 336/170 |
| 2016/0375781 A1 | 12/2016 | Herke et al. | |
| 2017/0240063 A1 | 8/2017 | Herke et al. | |
| 2018/0162229 A1 | 6/2018 | Götz et al. | |

FOREIGN PATENT DOCUMENTS

| | | |
|---|---|---|
| DE | 4233898 A1 | 4/1994 |
| DE | 102012212291 A1 | 2/2014 |
| DE | 102015110023 A1 | 12/2016 |
| DE | 102016123924 A1 | 6/2018 |
| JP | S51103225 U | 8/1976 |
| JP | S51103225 A | 9/1976 |
| JP | 56169525 U | 12/1981 |
| JP | H04364011 A | 12/1992 |
| JP | 06224052 A | 8/1994 |
| WO | 2013135689 A1 | 9/2013 |

OTHER PUBLICATIONS

Australian Examination Report for Australian Application No. 2018241042, dated Jul. 29, 2019, 3 pages.
Korean Office Action for Korean Application No. 10-2018-0164800, dated Feb. 4, 2020, 3 pages.
Japanese Office Action for Japanese Application No. 2018-235252, dated Jan. 15, 2020, 5 pages.
Indian Examination Report for Indian Application No. 201814042992, dated Aug. 13, 2020, with translation, 6 pages.

\* cited by examiner

TRANSFORMER DEVICE FOR A CHARGING STATION FOR ELECTRICALLY CHARGING VEHICLES WITH AT LEAST TWO CHARGING POINTS

CROSS-REFERENCE TO RELATED APPLICATION

This application claims priority to German Patent Application No. DE 10 2017 130 471.1, filed Dec. 19, 2017, which is incorporated by reference herein in its entirety.

FIELD OF THE INVENTION

The present invention relates to a transformer device for a charging station for electrically charging vehicles and to a method for manufacturing such a transformer device.

BACKGROUND OF THE INVENTION

It is known that transformer devices are used to supply charging stations with power in the form of electrical current. Such charging stations serve to charge electrically driven vehicles or the battery device thereof. Such charging stations are, similarly to the refueling stations which are already known, usually equipped with two or more charging points. At least one vehicle can be charged simultaneously at each charging point. This means therefore that at least two vehicles can also be charged chronologically in parallel by means of the transformer device at a charging station with at least two charging points. The transformer device serves here to supply the available electrical current in a form which is suitable for electrically charging the vehicles, and when necessary to make available DC isolation.

Contemporary electric vehicles generally permit two charging modes. For charging at a conventional alternating voltage connection or three-phase current connection a vehicle has an on-board charging device which both carries out a necessary conversion into direct current and controls the respective charging operation. However, this AC charging mode is severely limited in terms of the charging speed owing to the available connection power, which is generally not more than 16 A or 32 A, and owing to the installation of the charging device with sufficient power. This results in charging times of several hours per 100 km in contemporary electric vehicles. Owing to the long charging times for AC charging, DC rapid charging, preferably with direct voltage, has been developed. In contrast to AC charging, the electrical operating materials and components which are necessary for charging are not carried along in the vehicle but rather made available by a vehicle-external charging pillar. The charging pillar carries out the charging process, at the request of the vehicle, forms the voltage and current in such a way as is necessary for charging the respective vehicle battery. Correspondingly provided DC charging lines are electrically connected to the poles of the high-voltage battery of the vehicle by means of various contactors in the vehicle during the charging process. The power levels of conventional DC charging stations are currently typically up to 50 kW and are generally extracted directly from the low-voltage power system or local power system. However, charging power levels of more than 300 Kw would be desirable in order to improve on the charging speeds of more than 20 km/min. In addition, charging voltages of up to 1,000 V are desirable in order to charge batteries of future vehicles with 600 V or even over 800 V battery voltage and to achieve relatively high charging power levels with low charging currents. Exemplary details on DC charging are described inter alia in IEC 61851. Extraction of energy from the low-voltage power system or local power system for the charging of vehicles with more than 300 kW power is not beneficial to the stability of the power system, and a connection to the medium-voltage distribution power system or even the high-voltage power system provides significant advantages.

Patent application DE 10 2012 212 291, which is incorporated by reference herein, describes a system for electrical direct voltage charging which has at least one DC/DC controller module comprising a DC/DC step-down module without DC isolation and a DC/DC resonant converter module with DC isolation.

Patent applications DE 10 2015 110 023 and DE 10 2016 123 924, both of which are incorporated by reference herein, describe apparatuses for DC voltage charging of electrical vehicles, which apparatuses go by the name of spilt power line in specialist circles. Here, the desired DC isolation of the individual charging connections or charging points of a charging park from the energy system and from one another is carried out by means of a transformer with separate, non-grounded secondary windings. The advantage of this technology is the possible use of cost-effective and installation-space-effective, non-DC-insulating operating materials such as, for example, rectifiers, AC/DC converters and DC/DC converters subsequent to the respective secondary windings. The specified transformer can be fed here with corresponding winding ratios of low voltage, medium voltage or high voltage.

A disadvantage of the known solutions is that the complexity, the costs and the size of the transformer devices increase disproportionally depending on the number of charging points. This is on account of, in particular, the fact that asymmetrical charging situations can frequently occur in a charging station for two or more vehicles. An asymmetrical charging station is to be understood as a situation in which, for example, a vehicle is arranged for electrical charging at a first charging point, while a second charging point remains free. This means therefore that a common transformer device, in particular a common transformer device in the sense of split power line technology, is used to supply, in an asymmetrical fashion, a first charging point completely with charging power while the other charging point does not draw any charging power. This asymmetrical loading presents problems for the efficiency and problems in the form of local heating of the common transformer device. In addition, when there is asymmetrical loading the impedances of the winding is changed. This asymmetry has to be embodied structurally in the transformer device, as a result of which the latter is disproportionately large, expensive and complicated in design. In addition, the asymmetry has to be taken into account in the control of the system, for which reason said control is dependent on an extensive sensor system, entailing additional complexity and costs.

SUMMARY OF THE INVENTION

In view of the aforementioned disadvantages described above, described hereinafter is a cost-effective and simple transformer device for a relatively large number of charging points on a charging station.

Features and details which are described in conjunction with the transformer device according to aspects of the invention apply, of course, in conjunction with the method according to aspects of the invention, and respectively vice versa, with the result that reciprocal reference can always be made in respect of the disclosure of the individual aspects of the invention.

According to aspects of the invention, a transformer device is proposed for a charging station for electrically charging vehicles with at least two charging points. For this purpose, the transformer device is configured with an input connection for electrical connection to an electrical power source, for example an energy system with an alternating current or three-phase current. Furthermore, the transformer device has a primary winding and at least one secondary winding for each charging point. The secondary windings are DC isolated from one another and each have at least one winding section which is connected electrically in parallel and/or in series. Furthermore, adjacent winding sections of at least one secondary winding are preferably embodied in an axial direction in such a way that they at least partially overlap one another.

A power system is connected to the input connection, N rectifiers and DC converters for M charging points at the output.

In one refinement according to aspects of the invention, the primary winding is preferably magnetically coupled to the secondary winding. In particular, the secondary winding has at least two winding sections.

A transformer device according to aspects of the invention is therefore based on the known solutions and serves to equip a charging station with the possibility of electrically charging vehicles at at least two charging points. For this purpose, the transformer device is firstly equipped with an input connection. This input connection serves to make available an electrical power source, using a source of electrical current, that is to say for example, a connection to the electrical power system or a large battery device. One concept of the invention is based here on the configuration of the secondary windings.

At least one secondary winding is provided for each charging point. However, two or more secondary windings can also be connected in parallel in order to supply a single charging point with electrical power. The present invention is at least partially based here on the way in which, in the case of the secondary winding, said winding is arranged in relation to the adjacent secondary winding. The secondary windings are usually wound directly parallel to one another. This means therefore that for a first charging point a first secondary winding is wound radially around the core of the transformer device. Spaced apart therefrom in an axial direction and adjacent thereto there is then the secondary winding for a second electrical charging point etc. In the known solutions, corresponding asymmetry in a charging situation allows undesired shunt currents and equalizing currents and, in addition, local heating to occur to the point of destruction, entailing the disadvantages which have been explained.

One concept of the invention is then that the secondary windings are actually no longer to be wound on in the axial direction parallel next to one another and strictly separated from one another. Instead, despite the DC isolation which is present and the electrical parallel connection an at least partially overlapping winding for the secondary windings is made available. This means therefore that a first secondary winding is wound over a second secondary winding of an adjacent or of another charging point in an at least partially overlapping fashion. The interwoven arrangement, which will be explained in more detail later, is therefore produced in which interwoven arrangement different secondary windings are arranged one over the other in an overlapping fashion in the radial and axial directions.

A large number of advantages is achieved by virtue of the configuration and embodiment of the individual secondary windings such that they overlap or at least partially overlap, as described above. It is a decisive advantage here that as a result of this equalizing winding method, that is to say the overlapping arrangement of adjacent secondary windings, equalizing currents between the secondary windings are reduced, or reduced to a minimum, in particular even in asymmetrical charging situations. Homogenization of impedances, which also occurs, in particular, in asymmetrical charging situations, is also generated. In other words, the at least partially overlapping arrangement of adjacent secondary windings makes available, as it were, a structural winding concept which, at a structural level or at a winding level, already makes available a homogenizing effect on the impedance and a preventative effect on equalizing currents. This means in other words that even in the case of asymmetrical charging situations at different charging points the asymmetry has been equalized at an electrical level has been equalized or minimized by means of this structural concept. In other words, it is now possible to have recourse to a small, compact, cost-effective an energy-efficient concept for the transformer device independently of the actual charging situation. Transformer devices according to the present invention can therefore also be used for a large number of charging points, since the concept of the at least partially overlapping winding in itself already takes into account the asymmetrical, in particular highly asymmetrical, charging situations.

The axial direction is here according to aspects of the present invention, in particular the axial direction of the core of the transformer device around which the corresponding secondary windings are directed. In the simplest case, the axial direction is here the core axis or the winding axis of the secondary windings and is embodied as a straight line or essentially as a straight line. The radial direction according to the present invention is, in particular, perpendicular with respect to the axial direction and in the simplest case leads through the central gravity of the cross section of the respective limb.

It can be advantageous if in a transformer device according to aspects of the invention the secondary windings are formed so as to be free of overlap, or essentially free of overlap, with each other. This means that when the winding is rotated about the core axis or about the axial direction the secondary winding assumes such a large axial distance that it comes to rest completely next to itself and therefore free of overlap. The spreading in the axial direction therefore becomes so large that the secondary winding is formed free of overlap in comparison with itself and essentially overlapping completely with adjacent secondary windings. The described advantages, in particular the homogenization of impedances as well as the avoidance of equalizing currents is also significantly improved in this way. A safety distance or the use of insulating components can also be advantageously used here in the axial direction between the secondary windings in order to improve the advantages according to aspects of the invention even further, and the division in the axial direction can be configured even more precisely.

It can be a further advantage if, in a transformer device according to aspects of the invention, the sequence of the overlap of adjacent secondary windings in a radial direction changes in an axial direction, in particular the secondary windings are interwoven with one another, preferably interwoven in a helix shape. This is to be understood as meaning that as it were axial package sections, which constitute the respective packaging of different secondary windings resting one on top of the other in the radial direction, are formed in the axial direction. In the axial direction these radial package sections now lie next to one another, wherein a different layering arrangement of the individual secondary windings is present for each adjacent radial package section. Each layer corresponds here to a secondary winding, wherein in the direction of the axial direction the individual layers of the secondary winding migrate from the inside to the outside or from the outside to the inside. This therefore results in a double or multiple overlap, with the result that, in particular, a matrix-shaped configuration in cross section is produced. Therefore, for example in the case of three adjacent secondary windings in an overlapping method of configuration cross sections are conceivable in which three radial packing packages are arranged next to one other, resulting in the configuration of a 3×3 matrix. This sequence of overlapping of adjacent secondary windings occurs, in particular, taking into account the already discussed DC isolation of the individual secondary windings from one another.

It can also be advantageous if, in a transformer device according to aspects of the invention, each secondary winding has at least two axially spaced-apart axial sections and at least two radially spaced-apart radial sections. This is based, in particular, on a configuration form of the two preceding paragraphs, in which the described interweaving or helix-shaped interweaving of adjacent secondary windings is made available. The sections of the different secondary windings can be configured in a complementary, or essentially complementary, fashion with respect to one another here. A new axial section and/or a new radial section of the secondary winding is therefore produced in accordance with the cross section at each winding. If only the cross section through a plurality of adjacent secondary windings is considered, this gives rise to the described matrix shape in cross section with, in each case, for example three radial sections and three axial sections of a total of three secondary windings which together form a 3×3 matrix for the three radial packages.

A further advantage can be achieved if, in a transformer device according to aspects of the invention, the three secondary windings form a secondary winding package with their axial sections and their radial sections. This secondary winding package can also be embodied in cross section again as a 3×3 matrix here. If a larger number than three secondary windings is made available in order to form such a secondary winding package, the number in the cross-sectional matrix is correspondingly increased. In this context, it is preferably ensured that there is a uniform number in the matrix, with the result that, for example, a 2×2 matrix, a 3×3 matrix, a 4×4 matrix or a 5×5 matrix or the like is made available.

It is also advantageous if, in a transformer device according to aspects of the invention, at least two secondary windings form a secondary winding package, wherein at least two secondary winding packages are arranged next to one another in the axial direction. The secondary winding packages can be configured here in the way explained in the preceding paragraph. The use of two or more secondary winding packages in the axial direction one next to the other gives rise, as it were, to a modular design of the transformer device. The secondary winding packages form here a secondary winding module, wherein, for example in the case of a cross-sectional matrix of 3×3, the secondary winding package can be made available for three charging points for this module. The transformer device can then be of modular design such that as a result of the axial arrangement of a plurality of secondary winding packages next to one another for each additional secondary winding package with the same configuration form of the charging station it is now possible to add three additional charging points. If, for example, the transformer device is to be configured with a charging functionality for nine charging points, for this charging station the transformer device is made available with three modules with correspondingly three secondary winding packages each with a 3×3 matrix in cross section for the secondary windings. The modularity gives rise to a further reduction in costs and installation space in a transformer device according to aspects of the invention.

The transformer device in the paragraph above can be developed to the effect that a separate primary winding is formed for each secondary winding package. This separate primary winding permits the modularity to be made available not only in the case of the secondary winding but also in the case of the primary winding. The entire transformer device can therefore be made available in the combination as a self-contained module, in particular if a separate input connection is also formed for each secondary winding package in the following claim. The transformer device can therefore be embodied in a significantly more flexible way, with the result that it can be adapted essentially as desired to different situations of use in different charging stations.

It is a further advantage if, in the transformer device in the two paragraphs above, a separate input connection is formed for each secondary winding package. As has already been explained in the preceding paragraph, the flexibility in use of the modular design of the transformer device is therefore improved even more. In particular, this can be combined with a fixed connection of the input connections in the axial direction one over the other, with the result that, in a simple electrical assembly method, two or even more secondary winding packages can be connected electrically to one another in the axial direction with their own input connections and preferably also with their own separate primary windings and can be configured to form a common transformer device.

The subject matter of the present invention is also a method for manufacturing a transformer device according to the present invention, having the following steps:

forming primary winding in an electrically conductive connection to an input connection, and forming adjacent secondary windings for at least two charging points which overlap at least partially in the axial or radial direction.

By virtue of the embodiment of a transformer device in accordance with the invention, a method according to aspects of the invention provides the same advantages as have been explained in detail with respect to a transformer device according to aspects of the invention.

A method according to aspects of the invention can he developed to the effect that at least two secondary windings can be embodied jointly as a secondary winding package, wherein at least two secondary winding packages are arranged next to one another in the axial or radial direction. As has already been explained, secondary winding packages can be understood to be modules of the transformer device. The axial or radial arrangement of two or more of such modules next to one another in the form of two or more of such secondary winding packages within the scope of the present method shows once more the flexibility and the possibility of using a method according to aspects of the invention to equip even large and complex charging stations with a multiplicity of charging points using a simple assembly method, and the axial or radial arrangement of the modules next to one another with the transformer device according to aspects of the invention.

BRIEF DESCRIPTION OF THE DRAWING

Further features, advantages and details of the invention can be found in the following description in which exemplary embodiments of the invention are described in detail with reference to the drawings. In this context, the features which have been explained in the claims and in the description can each be essential to the invention individually per se or in any desired combination. In the drawings, in schematic form:

DETAILED DESCRIPTION OF THE INVENTION

Figure 1:
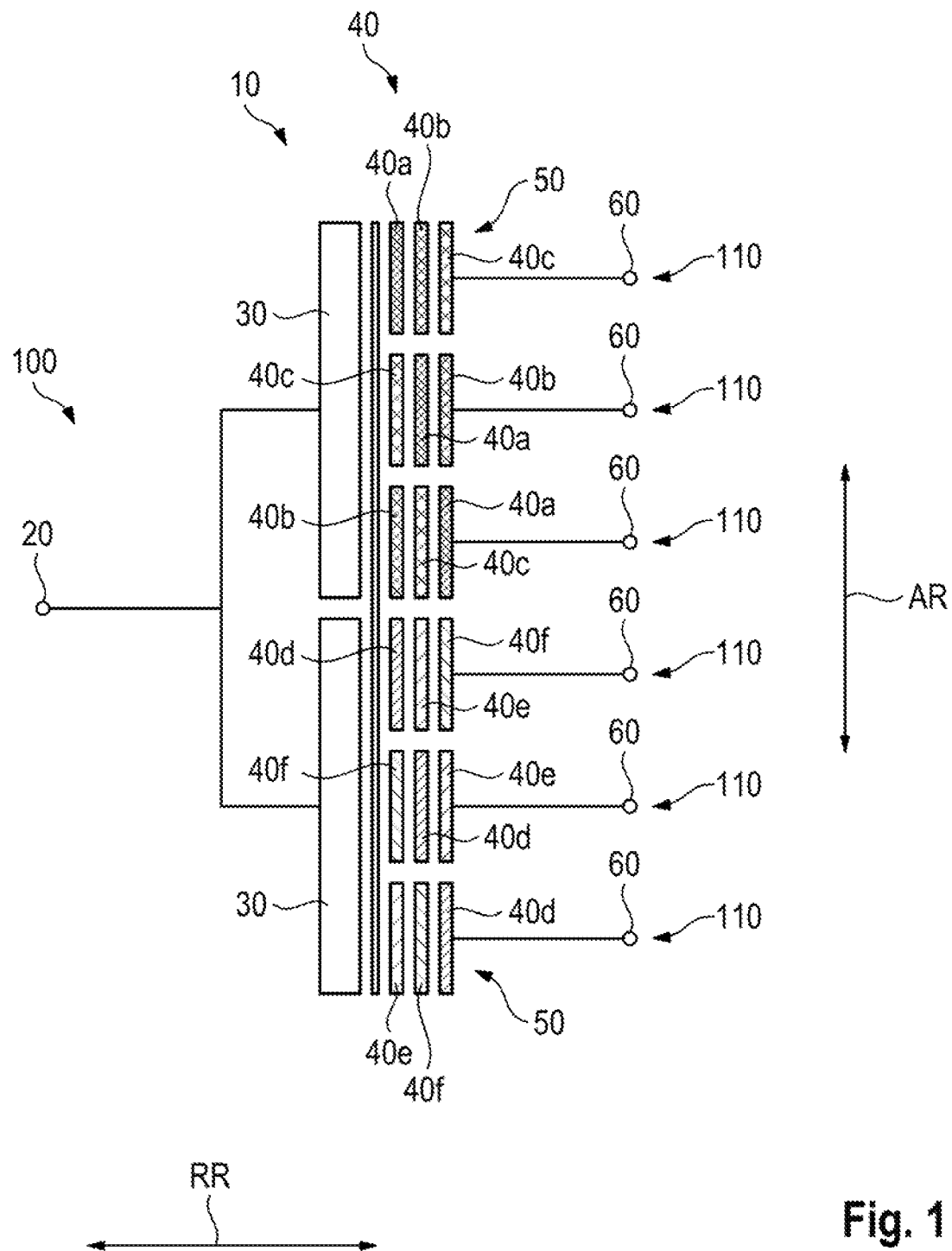
FIG. 1 shows a first embodiment of a transformer device according to aspects of the invention.

FIG. 1 shows schematically how a transformer device 10 according to the present invention can be constructed in order to equip a charging station 100 with, in this case, a total of six charging points 110. The transformer device 10 is configured here with a single input connection 20 which can be connected to a corresponding electrical power source. Starting from this electrical power source, the electrical power is then divided among the individual charging points 110, in this case six, and the associated output connections 60, and adjusted. This division is made available here on a module basis with two separate modules, an upper module and a lower module, and therefore also with an upper primary winding 30 and a lower primary winding 30. Two 3×3 matrixes are now provided in each module in the radial direction to the right, adjacent to the two primary windings 30. Each of the two secondary winding packages 50 is equipped here with secondary windings 40. The upper secondary winding package 50 has here the secondary windings 40a, 40b and 40c. The lower secondary winding package is equipped with the secondary windings 40d, 40e and 40f. The division can be clearly seen here, since an overlapping configuration is formed in the cross section of the 3×3 matrix in an axial direction AR, wherein neighboring secondary windings 40 always overlap with one another in the respective secondary winding package 50. This results in a correspondingly radial design in the radial direction RR, said radial design giving rise to the described 3×3 matrix.

Figure 2:
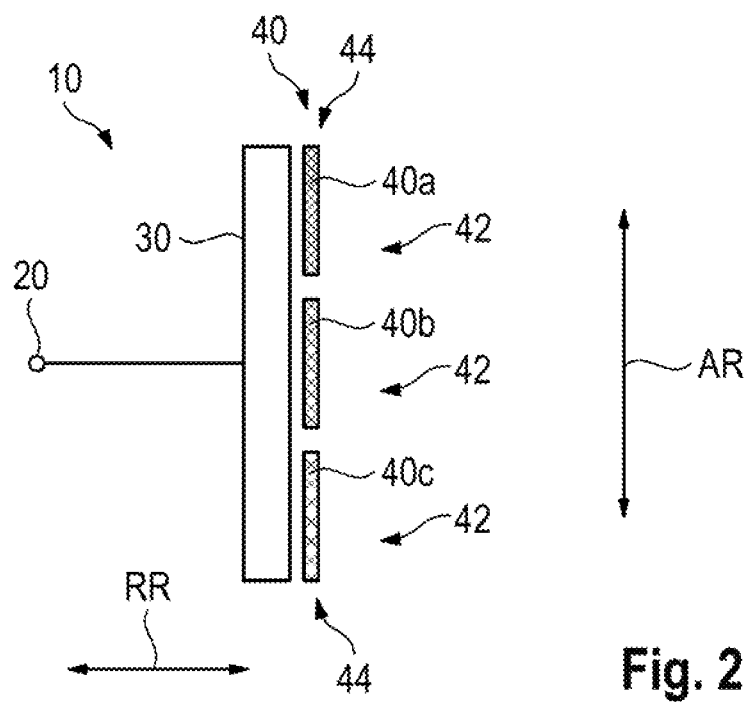
FIG. 2 shows a further embodiment of a transformer device according to aspects of he invention during a first method step.
Figure 3:
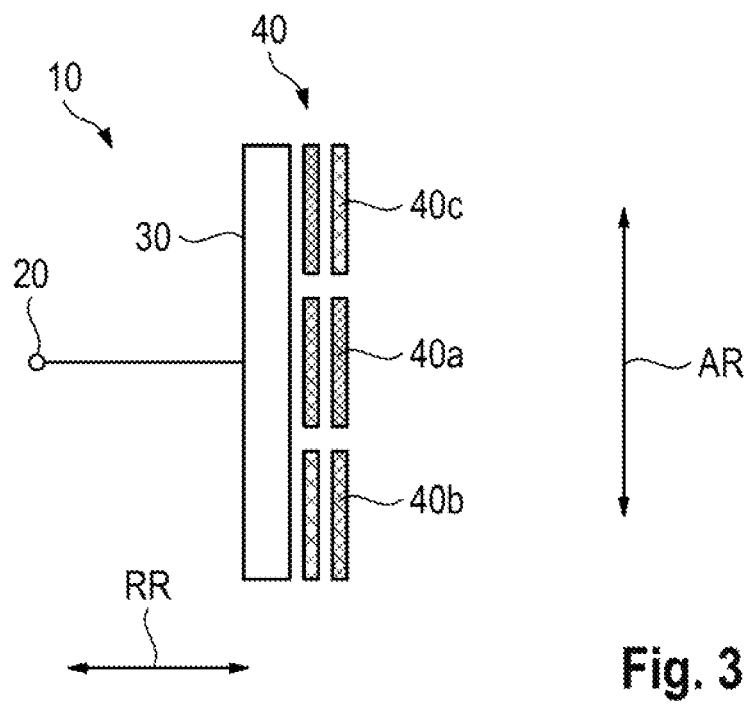
FIG. 3 shows the embodiment from FIG. 2 during a second method step.
Figure 4:
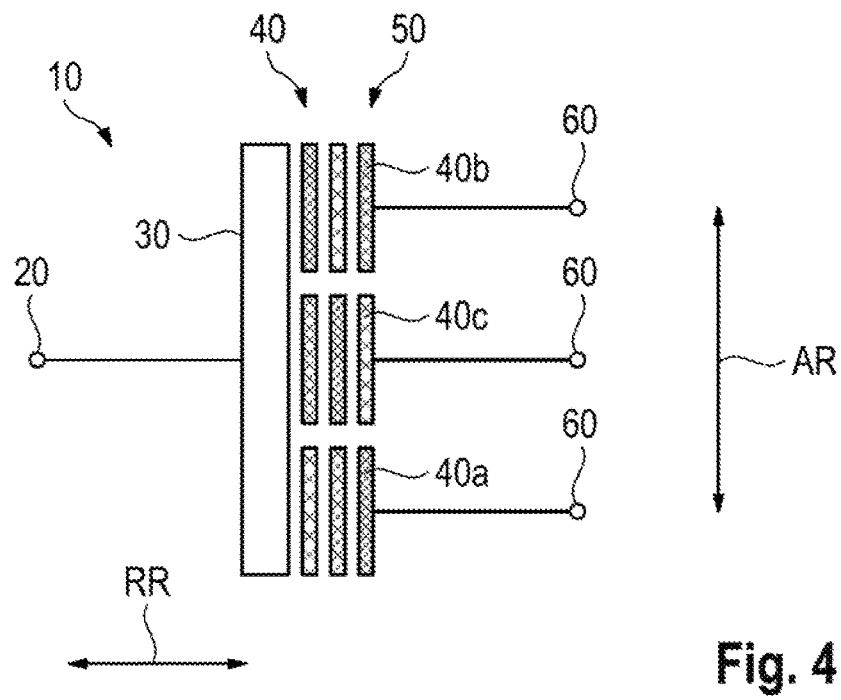
FIG. 4 shows the embodiments from FIGS. 2 and 3 after the ending of the method.

FIGS. 2 to 4 illustrate schematically how a transformer device 10 according to aspects of the invention or an individual secondary winding package 50 can be manufactured. The three secondary windings 40a, 40b and 40c can now be seen here again in the first winding during the winding around the primary winding 30, starting from the input connection 20. In this context, in each case an axial section 42 is arranged next to one another in the axial direction AR here. During the single rotation about the axial direction AR, an axial offset is now carried out, with the result that the first secondary winding section 40a now migrates from the top to the bottom in the axial direction AR and then comes to rest on the inner winding of the secondary winding 40c. The same also applies to the lowest secondary winding 40b, which has now also migrated downward in the axial direction AR. This second winding level is now shifted outward by one layer level in the radial direction RR. This step is then continued further outward and can give rise, for example to the 3×3 matrix embodiment according to FIG. 4. Of course, for each winding section it is also possible to make available a multiplicity of individual windings in a cross-sectional section, that is to say in an axial section 42 and/or in a radial section 44. Finally, the individual secondary windings 40 of the secondary winding package 50 are also equipped with output connections 60, in order to be able to make available the electrical power for the individual charging points 110 at the charging station 100.

Figure 5:
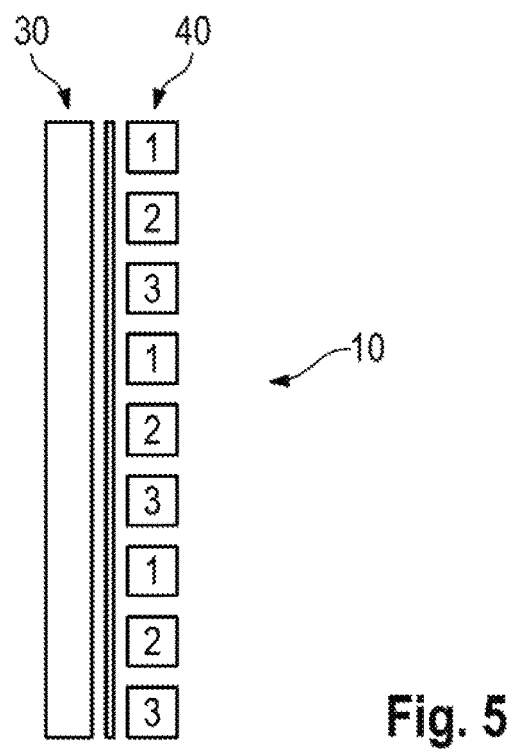
FIG. 5 shows transformer device according to aspects of the invention in a further embodiment.

FIG. 5 illustrates a further variant. For the sake of better clarity, the three different secondary windings 40 are characterized here by the numbers 1, 2 and 3. The alternative arrangement can also be seen well in the axial direction AR here.

The above explanation of the embodiments describes the present invention exclusively within the scope of examples. Of course, individual features of the embodiments can, where technically appropriate, be freely combined with one another without departing from the scope of the present invention.

What is claimed is:

1. A transformer device for a charging station for electrically charging vehicles with at least two charging points, the transformer device comprising:
    an input connection for electrical connection to an electrical power source,
    a primary winding, and
    at least one secondary winding for each charging point,
    wherein the secondary windings are DC isolated from one another and each have at least one winding section which is connected electrically,
    wherein adjacent winding sections of at least one of the secondary windings overlap one another at least partially in an axial direction, and
    wherein each secondary winding has at least two axially spaced-apart axial sections and at least two radially spaced-apart radial sections,
    wherein a sequence of the overlap of adjacent secondary windings in a radial direction changes in the axial direction, and the secondary windings are interwoven with one another.

2. The transformer device as claimed in claim 1, wherein the secondary windings are interwoven with one another in a helix shape.

3. The transformer device as claimed in claim 1, wherein axial sections and radial sections of three secondary windings form a secondary winding package.

4. The transformer device as claimed in claim 1, wherein at least two of the secondary windings form a secondary winding package, and wherein at least two secondary winding packages are arranged next to one another in the axial direction or radial direction.

5. The transformer device as claimed in claim 4, wherein a separate primary winding is formed for each secondary winding package.

6. The transformer device as claimed in claim 4, wherein a separate input connection is formed for each secondary winding package.

7. The transformer device as claimed in claim 1, wherein adjacent winding sections of at least one of the secondary windings are wound about each other.

8. The transformer device as claimed in claim 1, further comprising a plurality of primary windings, wherein one set of secondary windings overlap in the axial direction one of the primary windings, and another set of secondary windings overlap in the axial direction another one of the primary windings.

9. The transformer device as claimed in claim 1, further comprising a plurality of primary windings.

10. A method of manufacturing a transformer device for a charging station for electrically charging vehicles with at least two charging points, wherein the transformer device includes an input connection for electrical connection to an electrical power source, a primary winding and at least one secondary winding for each charging point, the secondary windings being DC isolated from one another and each having at least one winding section which is connected electrically, and adjacent winding sections of at least one of the secondary windings overlapping one another at least partially in an axial direction, and wherein the method comprises:

forming the primary winding in an electrically conductive connection to the input connection, and forming the adjacent secondary windings for the at least two charging points which overlap at least partially in the axial direction, wherein each secondary winding has at least two axially spaced-apart axial sections and at least two radially spaced-apart radial sections, and wherein a sequence of the overlap of adjacent secondary windings in a radial direction changes in the axial direction, and the secondary windings are interwoven with one another.

11. The method as claimed in claim 10, further comprising forming together at least two secondary windings as a secondary winding package, and arranging at least two secondary winding packages next to one another in the axial direction or radial direction.

\* \* \* \* \*